(12) United States Patent
Sherwood et al.

(10) Patent No.: US 9,938,093 B2
(45) Date of Patent: Apr. 10, 2018

(54) PROPPANT DELIVERY SYSTEM AND RELATED METHOD

(71) Applicant: Penny Technologies S.À R.L.

(72) Inventors: Ronald Mark Sherwood, Missouri City, TX (US); Chase H. Foster, Houston, TX (US)

(73) Assignee: C&J Spec-Rent Services, Inc., Houston, TX (US)

( * ) Notice: Subject to any disclaimer, the term of this patent is extended or adjusted under 35 U.S.C. 154(b) by 0 days.

(21) Appl. No.: 15/347,126

(22) Filed: Nov. 9, 2016

(65) Prior Publication Data

US 2017/0291780 A1 Oct. 12, 2017

Related U.S. Application Data

(60) Provisional application No. 62/320,257, filed on Apr. 8, 2016.

(51) Int. Cl.
| | |
|---|---|
| *B65G 69/18* | (2006.01) |
| *B65G 11/14* | (2006.01) |
| *B65G 15/00* | (2006.01) |
| *B65G 43/08* | (2006.01) |
| *B65G 65/40* | (2006.01) |
| *E21B 43/26* | (2006.01) |
| *E21B 43/267* | (2006.01) |

(52) U.S. Cl.
CPC .......... *B65G 69/182* (2013.01); *B65G 11/146* (2013.01); *B65G 15/00* (2013.01); *B65G 43/08* (2013.01); *B65G 65/40* (2013.01); *E21B 43/26* (2013.01); *E21B 43/267* (2013.01)

(58) Field of Classification Search
CPC ..... B65D 88/30; B65G 69/182; B65G 11/146
See application file for complete search history.

(56) References Cited

U.S. PATENT DOCUMENTS

| | | | | |
|---|---|---|---|---|
| 3,314,557 | A * | 4/1967 | Sackett, Sr. ............... | B28C 9/00 366/18 |
| 4,598,670 | A * | 7/1986 | Clamser .................. | F23G 5/444 110/101 CD |
| 6,065,922 | A | 5/2000 | Kato et al. | |
| 6,293,689 | B1 * | 9/2001 | Guntert, Jr. ........... | B28C 9/0418 366/2 |
| 6,474,926 | B2 * | 11/2002 | Weiss .................... | B28C 7/0495 414/332 |

(Continued)

*Primary Examiner* — Jonathan Snelting
(74) *Attorney, Agent, or Firm* — McGlinchey Stafford PLLC; R. Andrew Patty, II

(57) ABSTRACT

A delivery system for feeding particulate matter to a target location at a well site, including a transportable conveyor belt assembly; one or more silos in fluid communication with a particulate supply line, each of the silo inlets extending through a side wall of the respective silo and disposed at a different location from the others along a longitudinal axis of the respective silo; and for each silo an enclosed chute detachably attachable thereto so as to receive into the chute particulate matter gravity fed out of the respective silo and convey such matter into the housing of the conveyor belt assembly. The silos, the chutes and the housing enclose the particulate matter as it passes from the silos through the chutes and conveyor belt assembly to the target location, to inhibit the release of dust generated from movement of the particulate matter from the silos to the target location.

15 Claims, 9 Drawing Sheets

(56) References Cited

U.S. PATENT DOCUMENTS

| | | |
|---|---|---|
| 8,926,252 B2 | 1/2015 | McIver et al. |
| 8,944,740 B2 | 2/2015 | Teichrob et al. |
| 9,688,178 B2 * | 6/2017 | Pham .................... B60P 1/6418 |
| 2013/0209204 A1 | 8/2013 | Sheesley |
| 2014/0299226 A1 | 10/2014 | Oren et al. |
| 2015/0086308 A1 | 3/2015 | McIver et al. |
| 2015/0166260 A1 * | 6/2015 | Pham .................... B65D 88/30 |
| | | 414/471 |
| 2015/0360857 A1 | 12/2015 | Oren et al. |

* cited by examiner

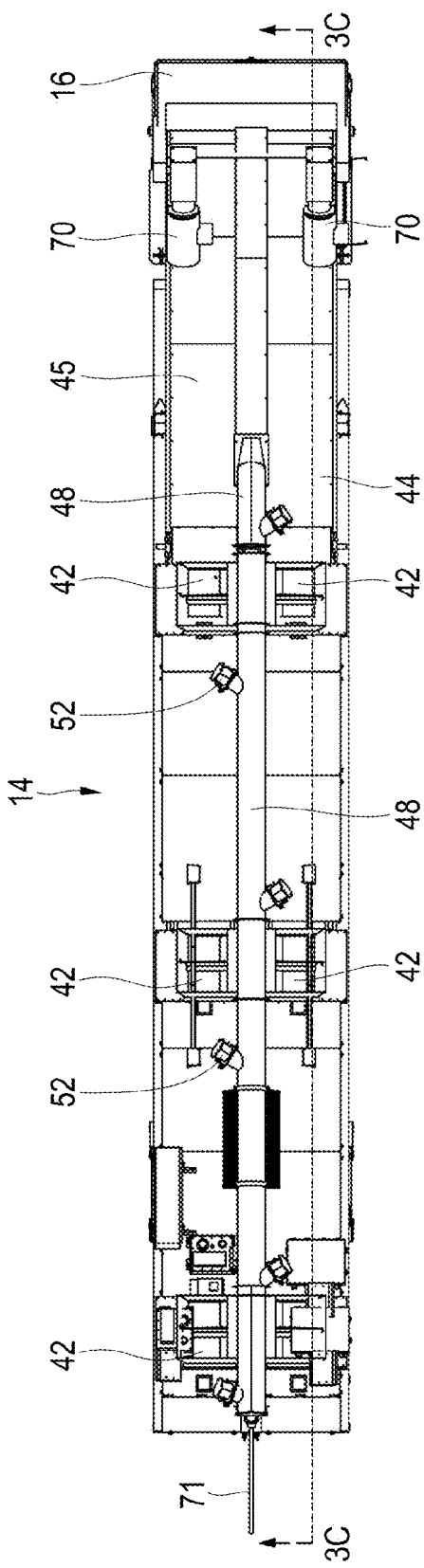
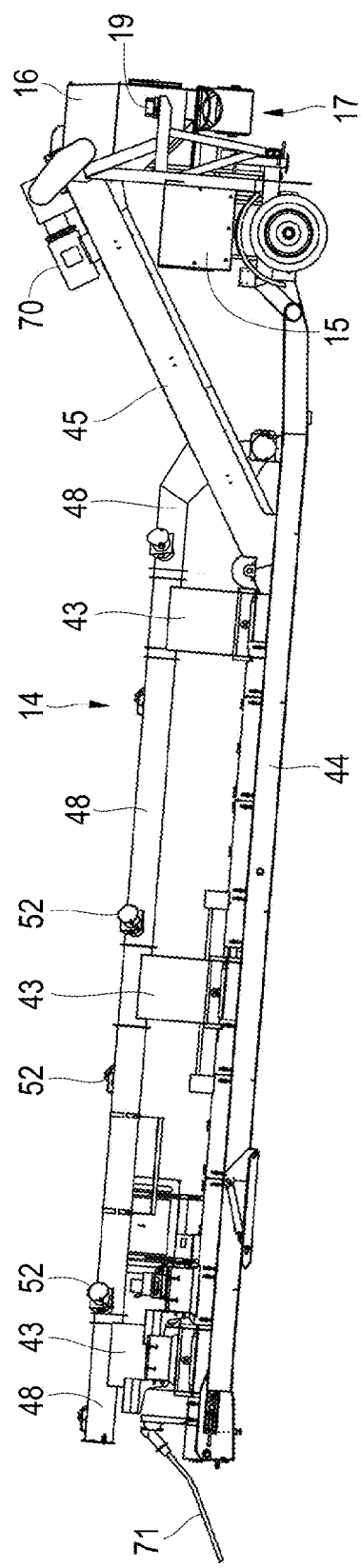
FIG. 3A
FIG. 3B

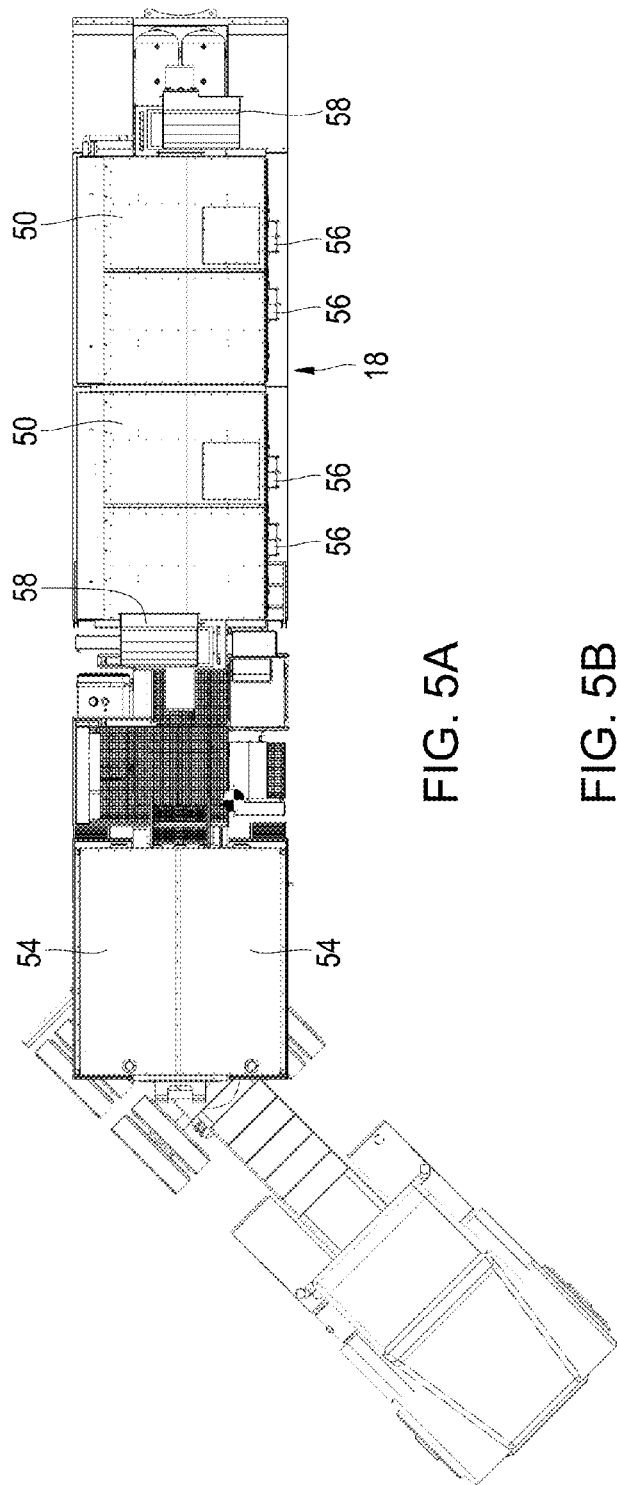
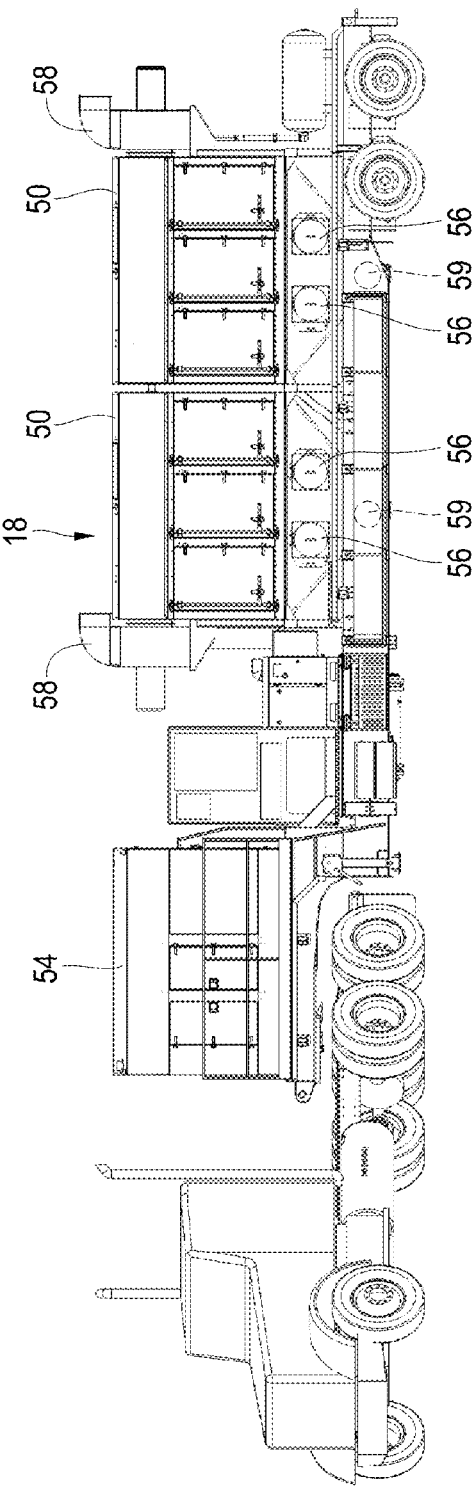
FIG. 5A
FIG. 5B

PROPPANT DELIVERY SYSTEM AND RELATED METHOD

CROSS-REFERENCE TO RELATED APPLICATIONS

Claim is hereby made to the priority of prior commonly owned U.S. provisional patent application No. 62/320,257, filed on Apr. 8, 2016, the disclosure of which is incorporated herein by reference.

STATEMENT REGARDING FEDERALLY SPONSORED RESEARCH OR DEVELOPMENT

Not applicable.

FIELD

The invention generally relates to the field of transportation and dispensing of bulk granular material, including sand or other proppants useful in oil and gas well completions.

BACKGROUND

This section introduces information from the art that may be related to or provide context for some aspects of the techniques described herein and/or claimed below. This information is background facilitating a better understanding of that which is disclosed herein. Such background may include a discussion of "related" art. That such art is related in no way implies that it is also "prior" art. The related art may or may not be prior art. The discussion is to be read in this light, and not as admissions of prior art.

In the oil and gas industry, use of well bores for the purpose of production or injection of fluid is common. The well bores can be used for exploration or extraction of natural resources disposed within formations, such as hydrocarbons, including oil and gas, water (collectively referred to herein as "formation fluids") or for $CO_2$ sequestration, for example. To increase the production from a well bore, a production zone located adjacent to the well bore may be fractured to allow for formation fluids to flow more freely from the production zone to the well bore.

The fracturing generally includes pumping fracturing fluids into the well bore at high pressure to fracture the subsurface formation. To retain the fractures in an open condition after fracturing pressure is removed, the fractures are typically physically propped open with a particulate matter known as a proppant, which is injected into the well bore with the fracturing fluid.

The proppant can be brought to the wellsite via road, rail or water, for example. Typically, transportable containers containing the proppant are situated at an area near the well bore and a conveyor belt system is used to deliver the proppant to a hopper, which subsequently feeds to a blender as needed. The blender can also receive a number of other materials, including water and dry or fluidic chemical additives, to form the fracturing fluid.

However, time, manpower requirements and mechanical maintenance issues are variable factors that can significantly influence the cost effectiveness and productivity of a fracturing operation. Further, existing processes can produce significant dust causing safety concerns for workers and maintenance concerns for equipment on site, and involve numerous conveyor belt arrays and associated motors, with accompanying high costs, maintenance and related environmental impact.

This invention is directed at least at resolving, or at least reducing, one or more of the problems mentioned above.

SUMMARY OF THE INVENTION

One aspect of the invention is a delivery system for feeding particulate matter (e.g., a proppant or the like) to a target location such as, for example, a mixer or blender, at a well site. The delivery system comprises:
  a transportable conveyor belt assembly comprising a housing forming one or more housing inlets and enclosing one or more motorized conveyor belts configured to feed the particulate matter placed thereon to the target location;
  one or more transportable silos, each silo forming one or more silo inlets all of which are in fluid communication with a particulate matter supply line, each of the silo inlets extending through a side wall of the respective silo, each of the silo inlets of the respective silo being disposed at a different location from the others along a longitudinal axis of the respective silo; and
  one or more enclosed chutes, each of the chutes being detachably attachable to a respect one of the silos and forming a passageway extending and sloping downwardly from an outlet of its respective silo to a respective one of the housing inlets, and being configured to receive into the passageway particulate matter gravity fed out of the outlet of the respective one of the silos, through the passageway and into the respective one of the housing inlets of the housing of the conveyor belt assembly;
wherein the silos, the chutes and the housing are configured to substantially enclose the particulate matter as it passes from the silos through the chutes and conveyor belt assembly to the target location, so as to inhibit the release of dust generated from movement of the particulate matter from the silos to the target location.

In another aspect, the invention provides a method for controlling the rate of feed of a particulate matter into a blender for mixing components of a desired fracturing fluid. This method comprises
  providing a delivery system according to one of the aspects of this invention, at a well site;
  feeding particulate matter into the silos; and
  feeding the particulate matter from the silos to the conveyor belts through the chutes and operating the conveyor belts to convey a feed of particulate matter from the silos into the blender.

In at least some aspects of the invention, the feed of particulate matter from the silos to the blender are substantially enclosed and under vacuum during operation of the delivery system. In still other aspects of the invention, the method further comprises adjusting the speed of the conveyor belts through a conveyor belt speed controller, based at least in part upon the signals from hopper load and/or level sensors, silo load and/or level sensors or all of them, indicative of either a weight or a level of particulate matter within a hopper assembly, within the silos or within both.

Yet another aspect of the invention is a method for controlling the rate of feed of a particulate matter into a blender for mixing components of a desired fracturing fluid, comprising
  feeding particulate matter into a plurality of transportable silos; and
  feeding by gravity the particulate matter from one or more of the silos to one or more enclosed chutes and into a transportable conveyor belt assembly comprising a housing enclosing one or more conveyor belts; and operating the conveyor belts to convey a feed of particulate matter from the silos into a hopper assembly in fluid communication with the blender;

wherein the silos, the chutes and the housing are configured to substantially enclose the particulate matter as it passes from the silos through the chutes and conveyor belt assembly to the hopper assembly, so as to inhibit the release of dust generated from movement of the particulate matter from the silos to the hopper assembly.

While multiple aspects of the invention are disclosed, still other aspects of the invention will become apparent to those skilled in the art from the following detailed description. As will be apparent to those of ordinary skill in the art from this disclosure, certain aspects of the invention disclosed herein may be modified in various ways, all without departing from the spirit and scope of the claims as presented below. Accordingly, the drawings and this textual description are to be regarded as illustrative in nature and not restrictive.

BRIEF DESCRIPTION OF DRAWINGS

The claimed subject matter may be understood by reference to the following description taken in conjunction with the accompanying drawings, in which like reference numerals identify like elements, and in which:

FIG. 3A is a top view of a conveyor belt trailer from the system of FIG. 1;

FIG. 3B is a side view of the conveyor belt trailer of FIG. 3A;

FIG. 5A is a top view of a vacuum and generator trailer from the system of FIG. 1;

FIG. 5B is a side view of the vacuum and generator trailer of FIG. 5A; and

Figure 1:
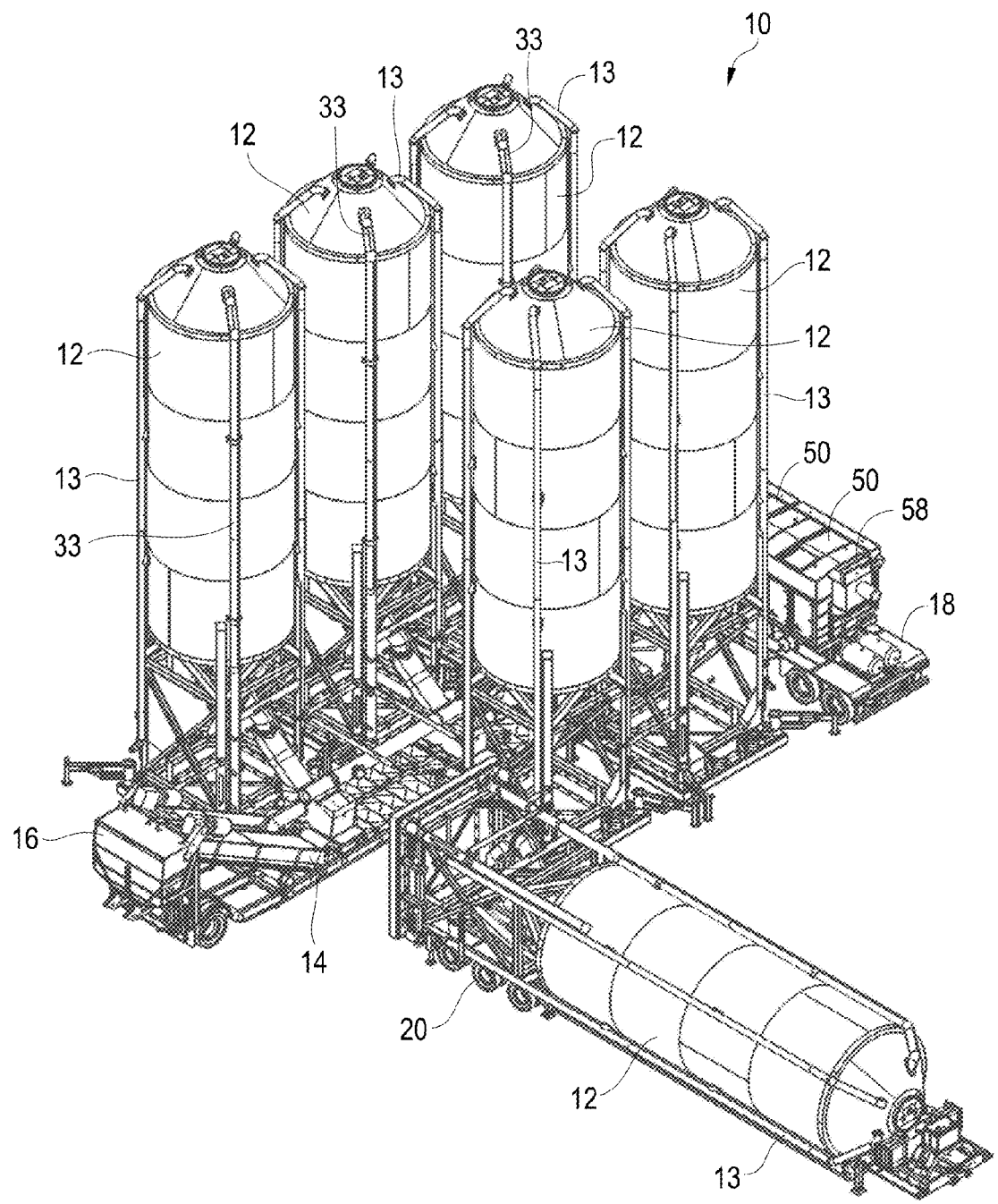
FIG. 1 is an elevated view in perspective of a proppant delivery system in accord with one aspect of this invention.

While the claimed subject matter is susceptible to various modifications and alternative forms, the drawings illustrate a specific embodiment herein described in detail by way of example. As noted earlier, the illustrations herein of specific aspects of the invention are not intended to limit the claimed subject matter to the particular forms illustrated or disclosed, but to the contrary, the intention is to cover all modifications, equivalents, and alternatives falling within the spirit and scope as defined by the appended claims, read in light of this description.

DETAILED DESCRIPTION

Illustrative embodiments of the subject matter claimed below will now be disclosed, along with various features and advantages of aspects of the invention. In the interest of clarity, not all features of an actual implementation are described in this specification. It will be appreciated that in the development of any such actual embodiment, numerous implementation specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. Further, various ranges and/or numerical limitations may be expressly stated below. It should be recognized that unless stated otherwise, it is intended that endpoints are to be interchangeable. Further, any ranges include iterative ranges of like magnitude falling within the expressly stated ranges or limitations disclosed herein is to be understood to set forth every number and range encompassed within the broader range of values. It is to be noted that the terms "range" and "ranging" as used herein generally refer to a value within a specified range and encompasses all values within that entire specified range.

As used herein, the terms "up" and "down", "upper" and "lower", "upwardly" and "downwardly", "upstream" and "downstream", "above" and "below" and other like terms indicating relative positions above or below a given point or element are used in this description to more clearly describe some embodiments of the invention. However, when applied to equipment and methods for use in wells that are deviated or horizontal, such terms may refer to a left to right, right to left or other relationship as appropriate. As used herein, the term "fluid" should be understood broadly to include liquid, solid, gas and combinations thereof, as will be appreciated by those skilled in the art. Further, a fluid, as described herein, may be in the form of a solution, an emulsion, a slurry or any other form known to ones skilled in the art. To the extent a term used in a claim is not defined below, it should be given the customary definition skilled persons in the pertinent art have given that term as reflected in printed publications and issued patents at the time of filing this disclosure.

Furthermore, various modifications may be made within the scope of the invention as herein intended, and embodiments of the invention may include combinations of features other than those expressly claimed. In particular, flow arrangements other than those expressly described herein are within the scope of the invention.

It should be understood that, although a substantial portion of the following detailed description is provided in the context of oilfield hydraulic fracturing operations, other oilfield operations, such as cementing, gravel packing etc. can utilize and benefit from the disclosure of the current application as well.

The Illustrated Delivery System

Turning now to the figures, FIG. 1 illustrates a partially assembled proppant delivery system 10 in accord with one aspect of this invention. System 10 as illustrated is configured with six (6) substantially enclosed, transportable, hollow silos 12 that may be coupled to a transportable conveyor belt assembly 14 which is trailer-mounted in this particular illustration. Conveyor belt assembly 14 includes a hopper 16, mounted on the same trailer as the conveyor belt assembly 14. Particulate matter, for example sand or other proppant material placed within silos 12 after they are erected to vertical position, is fed from the silos 12 into and through conveyor belt assembly 14 and into hopper 16. System 10 further includes a generator and vacuum systems trailer 18 which supplies a vacuum with dust removal capabilities, and electrical power, to system 10. Typically, sand or other proppant delivery trucks S (FIG. 6) will be equipped with pneumatic blowers and pneumatic feed hoses H (FIG. 6) for use in pneumatically offloading the particulate material from the trucks into pneumatic feed tubes 13 and into the silos 12 once they are erected into vertical position. Five of the illustrated silos 12 are shown in a vertical position adjacent to conveyor belt assembly 14, while a sixth silo 12 is horizontally disposed on a transport trailer 20 positioned and equipped to elevate and install the sixth silo 12 into place to complete the system assembly.

Figure 2A:
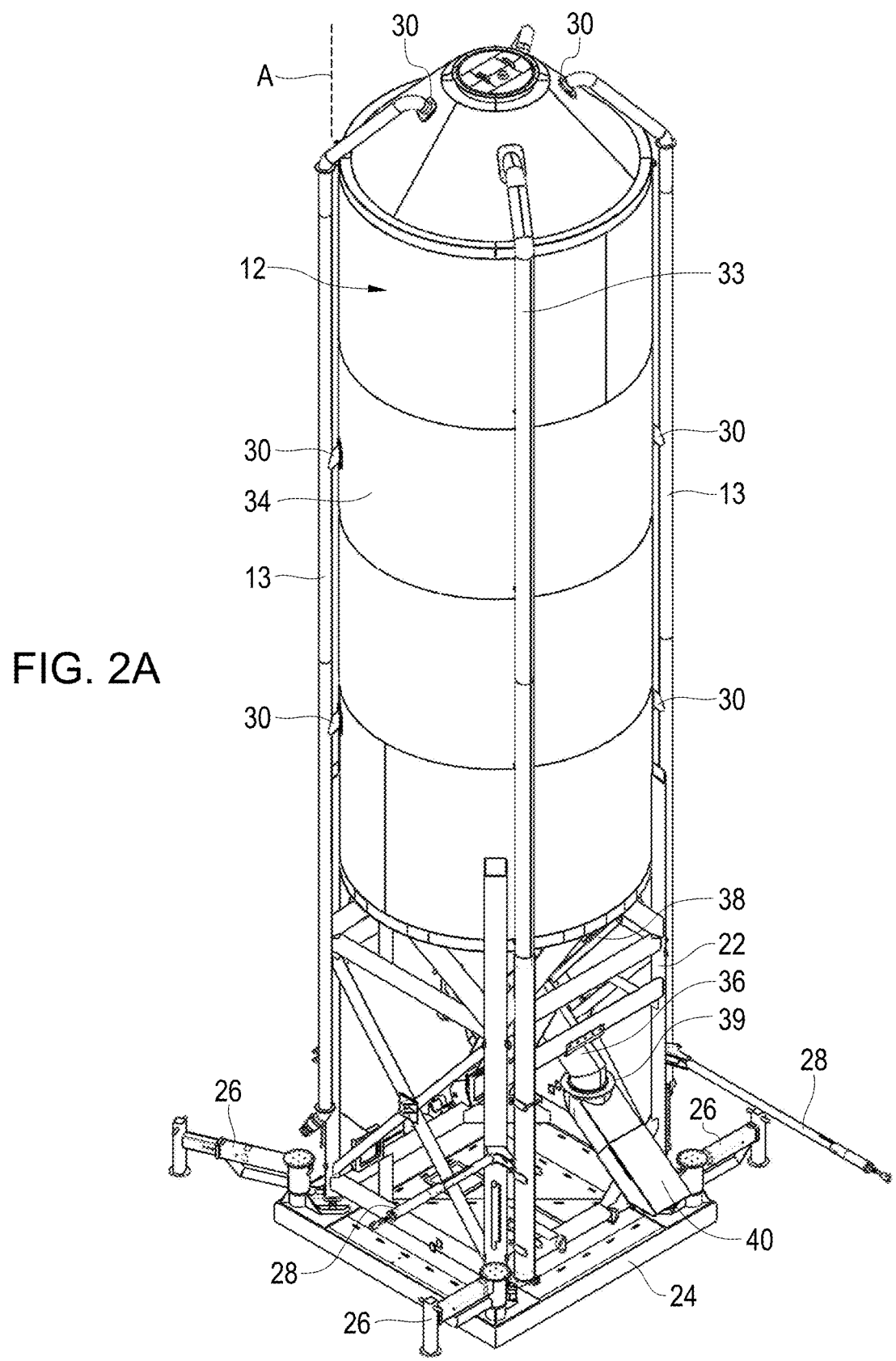
FIG. 2A is an elevated view in perspective of one silo from the system of FIG. 1.
Figure 2B:
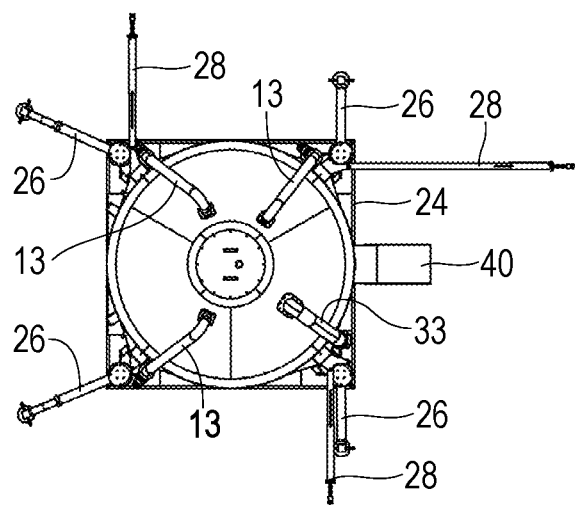
FIG. 2B is a top view of the silo of FIG. 2A.
Figure 2C:
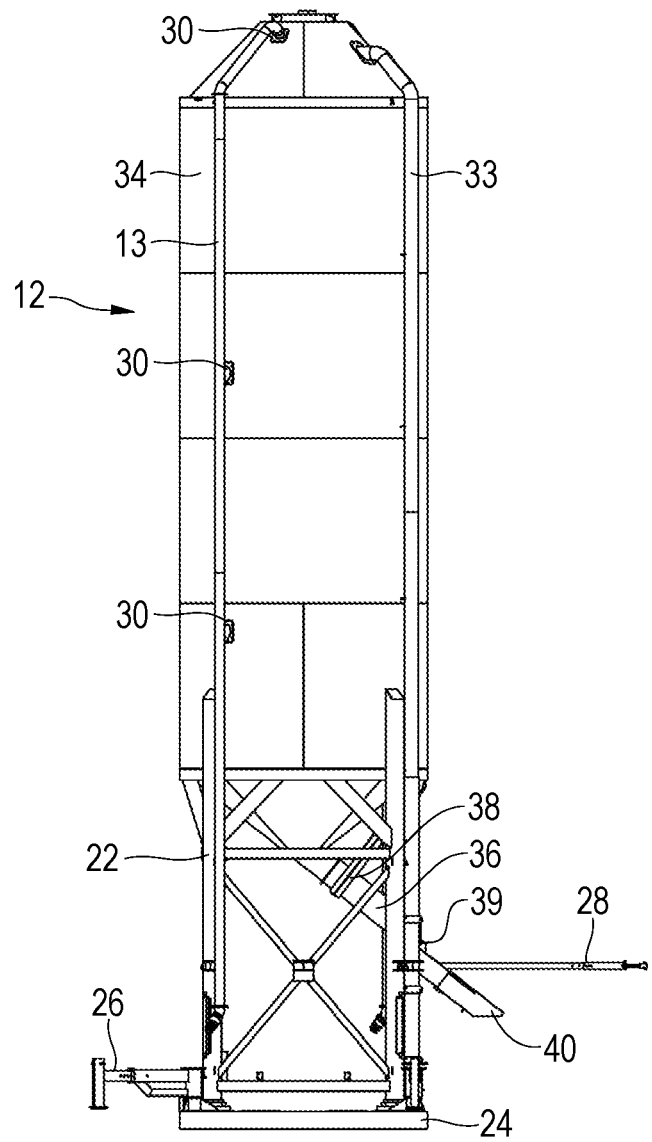
FIG. 2C is a side view of the silo of FIG. 2A.

As can be noted from FIGS. 2A-2C, each silo 12 is mounted on a four-legged, silo support base assembly 22 which itself is mounted to a support plate 24 to which is mounted telescoping, pivoting outriggers 26 and laterally extending cross-arm supports 28 that are configured to be coupled to and decoupled from adjacent support assemblies when the silos 12 are disposed adjacent to one another and it is desired to connect the support base assemblies together for added stability (e.g., during windy conditions), in addition to the enhanced stability provided by outriggers 26. Each silo 12 defines a plurality of inlets 30 in vertically aligned groups of three, all of which are in fluid communication with a respective pneumatic feed tube 13, each of the silo inlets 30 extending through a side wall 34 of the respective silo 12. Each of the silo inlets 30 of the respective silo 12 in each group of three is disposed at a different location from the others in the group, along a longitudinal (vertical when the silo has been erected) axis A (FIG. 2A) of the respective silo 12, so that each of the inlets 30 in each group are disposed at different elevations when the silo 12 is vertically positioned. Each silo 12 further includes a pressure relief valve (not shown) and at least one vacuum line 33 for removal of dust from within the respective silo 12.

Figure 3C:
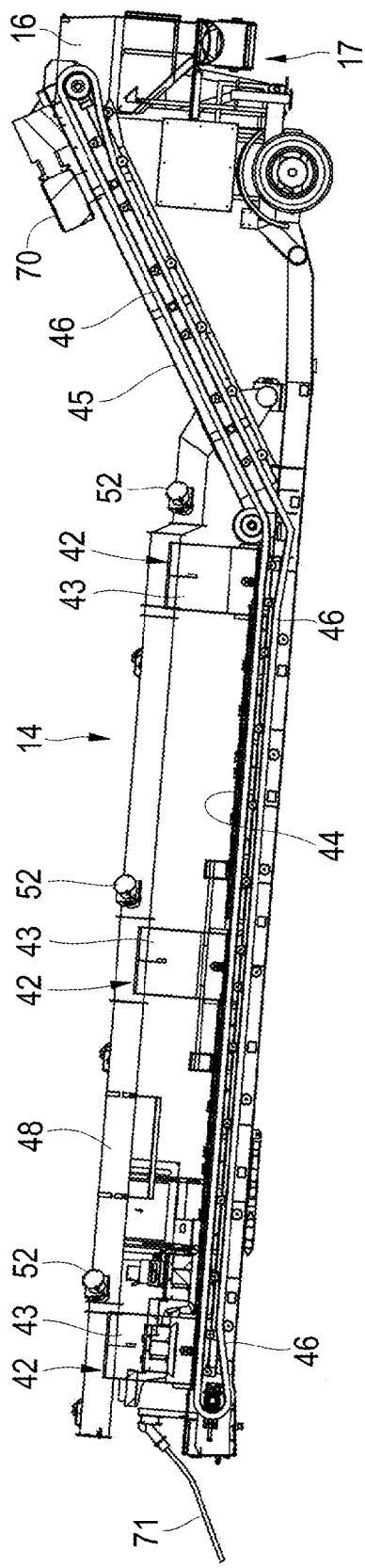
FIG. 3C is a cross-sectional view of the trailer of FIG. 3A, the cross-section being taken along line 3C-3C of FIG. 3A.
Figure 3D:
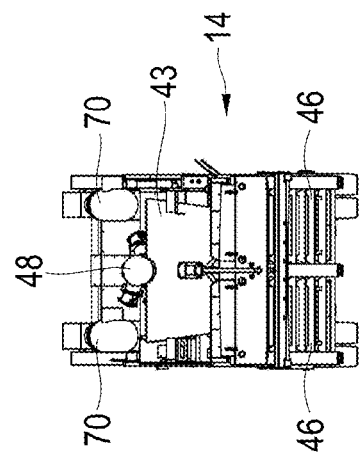
FIG. 3D is another side view of the conveyor belt trailer of FIG. 3A, but with the trailer rotated counterclockwise 90 degree about a vertical central axis.

Each silo 12 further includes a funnel-shaped bottom that empties into an outlet pipe 36 coupled to a silo gate 38 and a swivel coupling 39 in fluid communication with an enclosed, telescoping chute 40, chute 40 being configured to allow for adjustment in its length so that the downstream end of chute 40 may be coupled to an inlet 42 of a housing 44 (as seen for example in FIGS. 3A-3C) of conveyor belt assembly 14. The components of system 10 are sized and configured so that enclosed chute 40 at its lowest vertical point, at its downstream end, is positioned above and may be coupled to housing 44 and its respective housing inlet 42 at the top of a respective pants leg-style tub or diverter 43 (FIGS. 3A-3D) when silo 12 is positioned adjacent to conveyor belt assembly 14. Proppant in silo 12 may be controllably dispensed through gate 38 into the respective chute 40 by gravity into housing inlet 42 and onto two conveyor belts 46 (see, e.g., FIGS. 3C and 3D) disposed laterally adjacent and parallel with one another within housing 44.

Conveyor belt assembly 14 is shown in greater detail in FIGS. 3A-3D. There it may be seen that housing 44 of conveyor belt assembly 14 substantially encloses motorized conveyor belts 46 and their associated mechanical parts along their length, including two electric motors 70 for driving the respective conveyor belts 46, and an upwardly extending ramp section 45 which feeds into hopper 16 supported by a hopper assembly 17. Hopper assembly 17 is equipped with one or more hopper load cells 19 (preferably two or more in number, for increased redundancy and accuracy) which are electronically coupled to a system controller 15, to provide controller 15 with load data regarding the contents of hopper 16 during operation of system 10. Housing 44 further defines hydraulically gated inlets 42, each at the bottom of and within a respective leg of a pants leg-style tub or diverter 43 (three diverters are shown in the figures) for receiving a feed of particular matter from a respective one of the chutes 40. The pants leg-style of each diverter 43, with guillotine-type hydraulically gated inlets 42 controlling flow through each leg of tub 43, allow for selective distribution of particulate matter to none, either one or both of the dual conveyor belts 46 below. Assembly 14 further includes a generator power line 71 as a power source to assembly 14, and a vacuum conduit line 48 in fluid communication with the interior of housing 44 and one or more vacuum pumps 50 (FIGS. 5A and 5B) on trailer 18. Vacuum line 48 is further equipped with vacuum ports 52 for coupling the vacuum system to each of the respective vacuum lines 33 of each of silos 12.

FIGS. 5A and 5B show the generator and vacuum systems trailer 18 in greater detail. Trailer 18 enables transportation of one or more generators 54 and dual vacuum pumps 50 to a position adjacent silos 12 and belt assembly 14, as noted in FIG. 1. Vacuum pumps 50 house self-cleaning filter bags (not shown) and have respective inlet ports 56 and filtered air discharges 58 and are configured to filter incoming dust from air entering ports 56 from the vacuum lines 48 and 33 in fluid communication with the enclosed silos 12, the enclosed chutes 40 and the conveyor belt housing 44. Pumps 50 are also configured to convey the captured dust via an auger 59 into additional disposable bags (not shown). While they may or may not be preferred for a given system configuration, various other vacuum pump systems with conventional filtering capabilities to capture dust from the proppant feeding through system 10 are also contemplated to be within the scope of this invention.

Figure 4A:
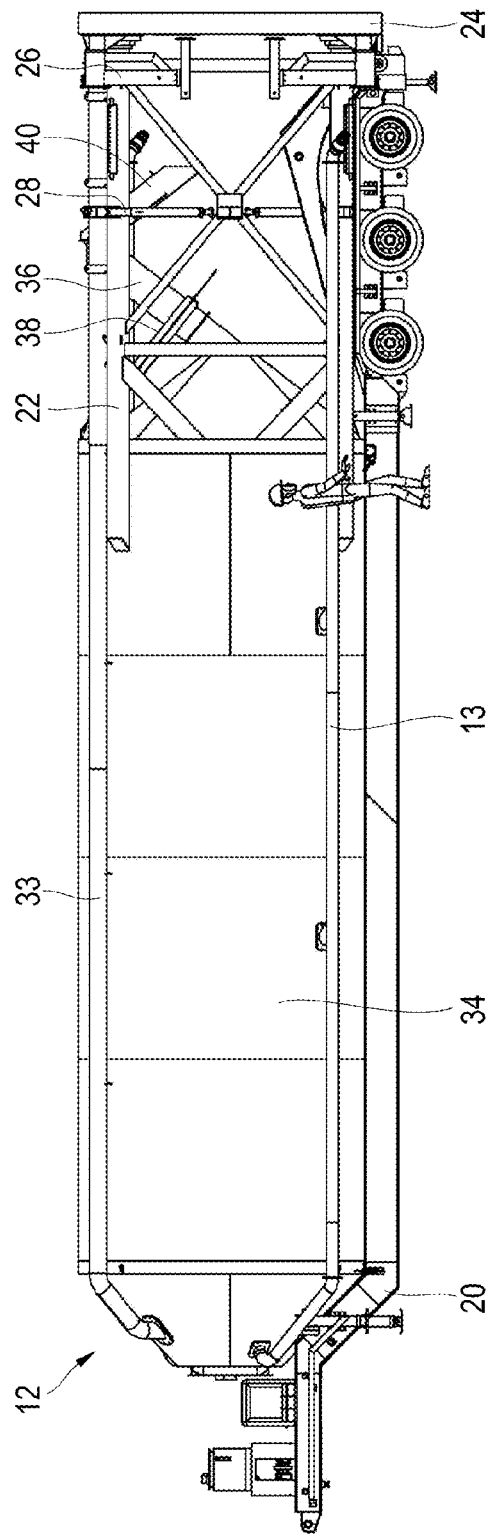
FIG. 4A is a side view of one of the silos from the system of FIG. 1, disposed horizontally and disposed on a transport trailer.
Figure 4B:
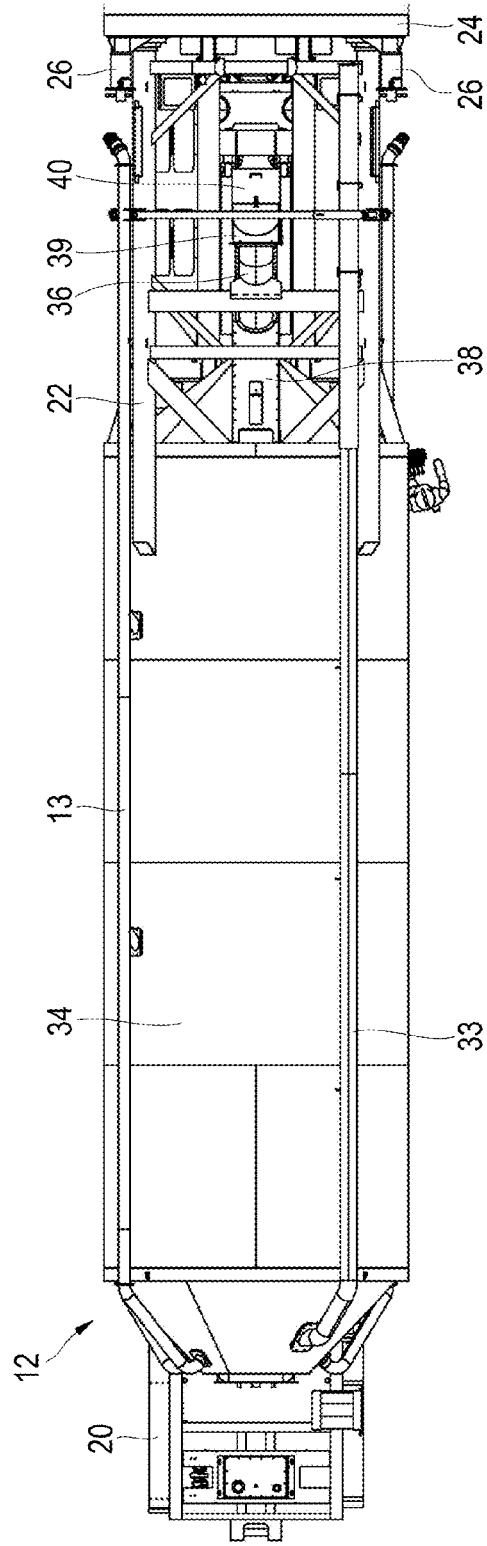
FIG. 4B is a top view of the silo and trailer depicted in FIG. 4A.
Figure 4C:
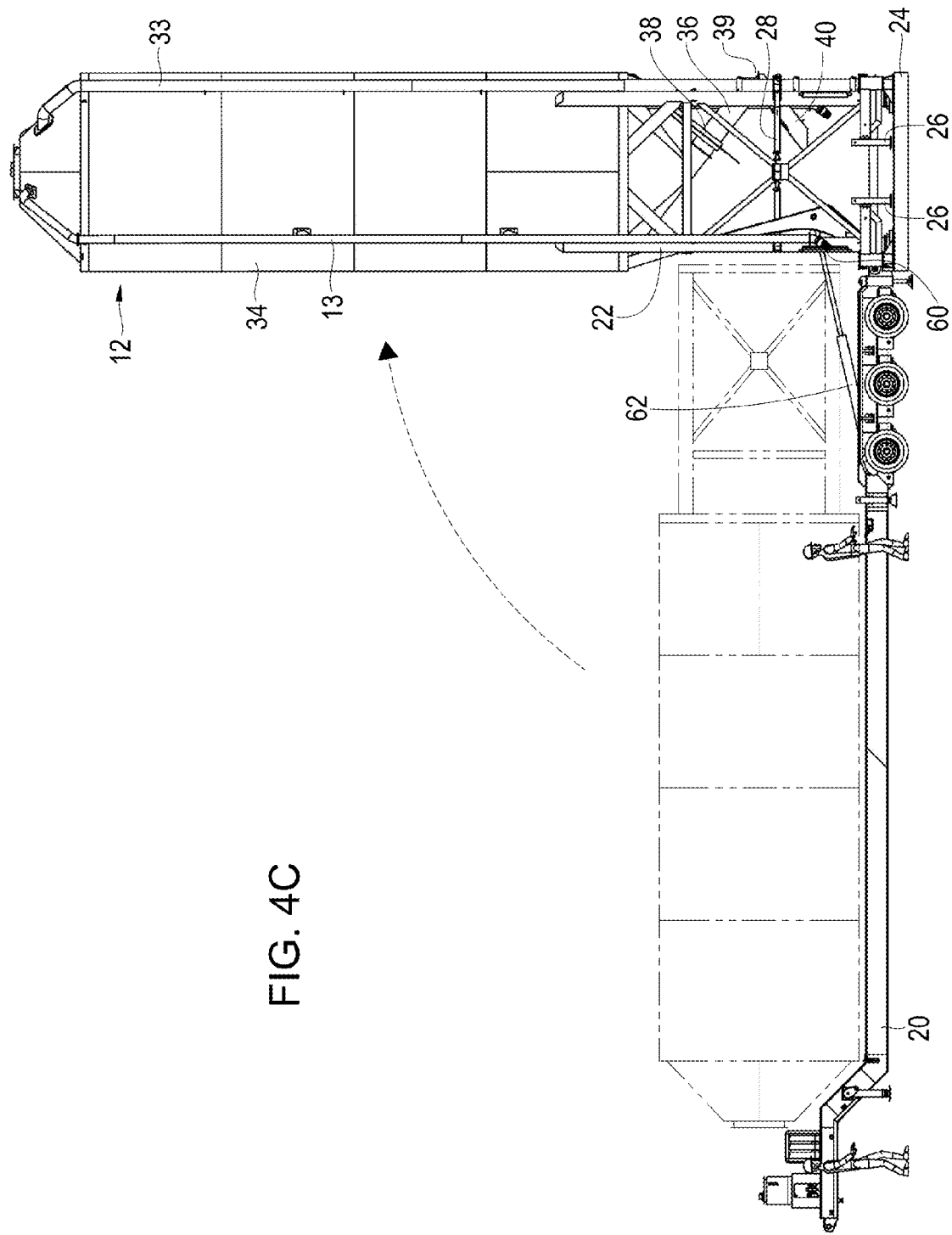
FIG. 4C is another side view of the silo and trailer of FIG. 4A, showing the erection of the silo into a vertical position.

Transporting silos 12 into position is further illustrated in greater detail in FIGS. 4A-4C illustrate in greater detail trailer 20, which shows empty silo 12 disposed on one side on trailer 20 for transportation to or from a well site. Support base assembly 22 is equipped with a coupling 60 configured for pivoting attachment to a hydraulic ram assembly 62 connected to trailer 20 so that ram assembly 62 may be actuated to elevate silo 12 into an elevated, vertical position as shown in FIG. 4C (or lower silo 12 from an elevated to a horizontal position onto trailer 20) when the rear end of trailer 20 is in position next to silo 12. Preferably, two, three or even four couplings are provided, each on a different side of support base assembly 22, so that trailer 20 may approach silo 12 from different sides when vertically disposed, to provide logistical options when disassembling or assembling system 10 at a well site.

Figure 6:
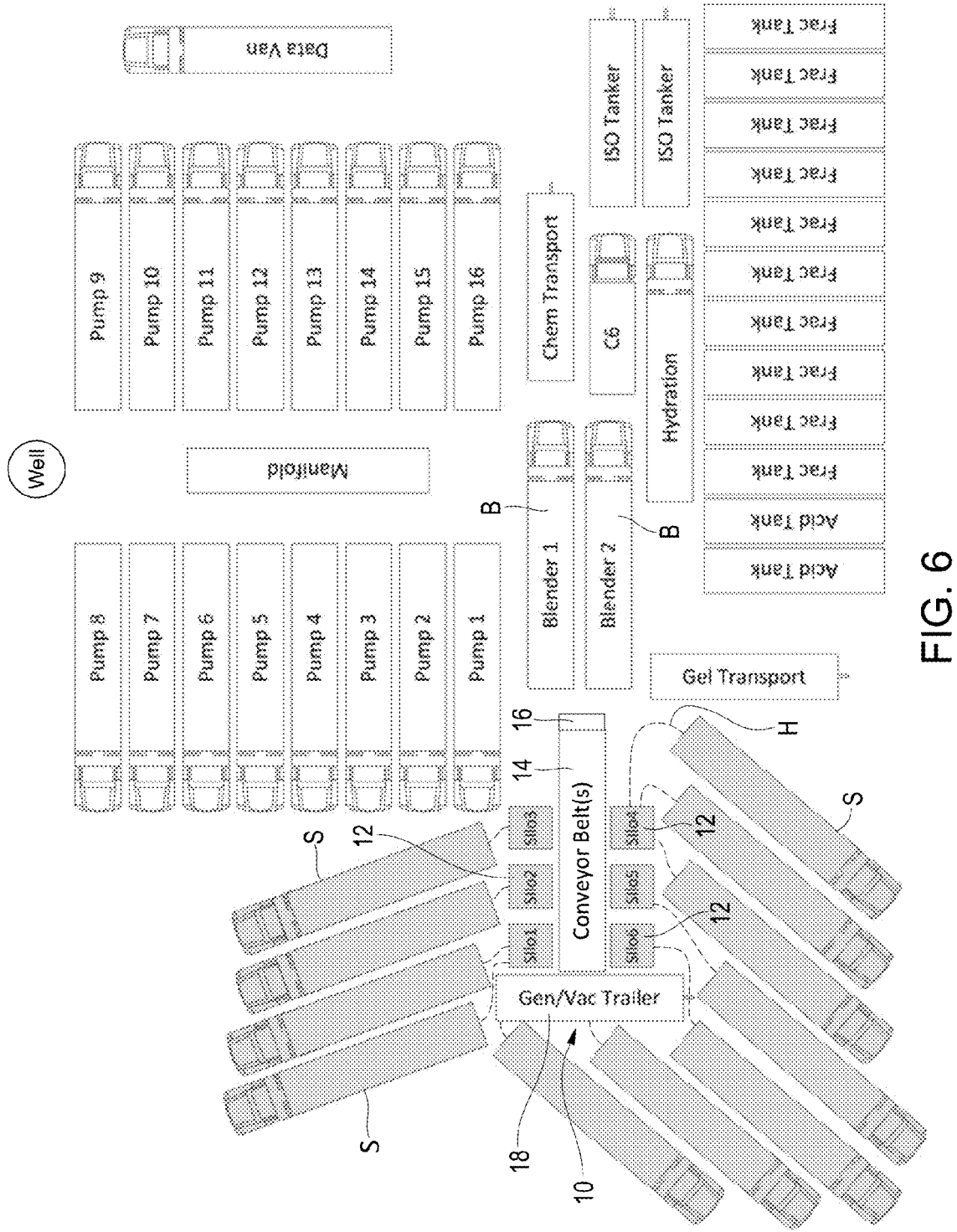
FIG. 6 is a top plan view of the layout of a typical well site employing the delivery system of FIG. 1.

Finally, FIG. 6 illustrates the general layout of a typical well site employing system 10. The proppant is generally delivered to the site in sand trailers S to silos 12. Hopper 16 receives sand or other proppant from conveyor assembly 14, which is supplied by silos 12, and distributes it into the blenders B (also referenced in the drawings as "mixers"). This portion of the well site includes the proppant delivery system of this invention. Blenders B are provided to blend proppant fluid components with the proppant itself, and then the resulting mixture is transferred to one or more manifolds. The final mixed and blended slurry (i.e., fracturing fluid) is then transferred to pump trucks and routed at high pressure through treating lines to the rig and then pumped downhole. While not shown explicitly herein, the proppant delivery system 10 is contemplated for use with additional systems and equipment as known in the art for forming and delivering a fracturing fluid to a well bore.

Further details regarding the operation of individual components of system 10 will now be provided.

The Silos

As noted in the descriptions of the example illustrated in the accompany figures, the proppant is generally disposed within one or more transportable, hollow silos. As depicted in FIG. 1, the one or more silos typically will be brought to the site via a silo trailer. The silos may be transported on the silo trailer in a horizontal manner and, once on site, the silos may be lifted (e.g., via a hydraulic ram pivotally coupled to the silo support base assembly) such that the silo is tilted off of the trailer until it is oriented vertically with an outlet disposed nearer to the ground. Each silo generally includes a portion having a horizontal cross sectional area that is progressively smaller as it approaches the outlet (e.g., forming a conical bottomed vessel). Each silo has an outlet formed at or near the bottom. Adjacent to the outlet, the silo generally includes a tapered portion, such as a downwardly slanted, tube or pipe, etc. to enable gravity feed to an enclosed, chute that slopes downwardly toward the conveyor belt assembly housing. The outlet of the silo may further include a closure mechanism, such as a gate or valve for example, between the outlet and the chute. The closure mechanism or gate is adapted to prevent the passage of the proppant therethrough when closed, or alternatively to allow such passage when in an opened position. However, unlike previous systems, the closure mechanism is generally not adapted to meter the amount of sand passing therethrough, as such methods generally require manual operation. The gates are preferably electronically controlled and placed either in an open or closed position, depending upon the proppant flow onto the conveyor belt(s) desired.

The gate generally positioned at the silo outlet is slidably movable between a first position covering the outlet and a second position opening the outlet. The gate is slidably affixed at the outlet formed at the bottom of the silo so as to be movable. An electrical or hydraulic actuator may be engageable with the gate so as to move the gate from the first position to the second position.

Each silo is generally supported via a support base assembly. The support base assembly support structure may include support beams and a base plate. Once the silo is in the upright position (i.e., the longitudinal central axis of the silo extends vertically) the support base assembly maintains the silo in a fixed position relative to the base plate. The support structure may include a plurality of vertical support beams and a plurality of cross beams that interconnect adjacent vertical support beams. The cross beams may be substantially straight or have a curved shape, for example.

Typically, each silo may have a capacity of up to, e.g., 400,000 pounds of typical frac sand, although the volumes may vary. Each silo further includes a plurality of inlets for introducing the proppant thereto. In one or more embodiments, the plurality of inlets may include inlets disposed in each third of the silo. On each horizontal plane, from 1 to 4 inlets typically may be included. Thus, in such an embodiment where there are 3 inlets at a horizontal plane in each third of the silo (divided vertically), each silo includes 9 inlets. In the example illustrated in the drawings, at least one horizontal inlet plane is formed at or adjacent to the top of the silo.

The proppant may be introduced into the silo via methods known to one skilled in the art, such as via pneumatic blowers, etc. It is contemplated that the proppant is introduced into the silo once the silo is on-site and oriented vertically (rather than transporting the silo filled with proppant). The proppant, as used herein, may include any proppant known to ones skilled in the art, such as sand, glass beads, sintered metals, walnut shells and combinations thereof, for example. In one aspect of the invention, the proppant comprises sand. Fracturing operations generally require large amounts of proppant. However, it has been difficult to store such large volumes of proppant at well sites. In conventional systems, the proppant is delivered into complex, open systems that include conveyors that load into central conveyors from horizontal sand bins. However, such conventional containers still take up a large footprint and can block access to certain areas of the well site. The systems of this invention enable a substantially dust-free delivery of large amounts of particular matter as needed for a given operation, in a much smaller footprint that allows as much, if not more volume to be fed into the target location, while saving space, facilitating logistics and minimizing waste and environmental issues.

Load Cells and Level Sensors

Each silo may be equipped with one or more, and preferably multiple, silo load cells, positioned in the assembly of the system to measure the load of an associated silo, normally between the silo itself and the support base assembly structure. The silo load cell(s) may be disposed at any location on the silo such that the weight can be measured. For example, one or more load cells may be disposed on one or more legs of the support base assembly. In one aspect of the invention, a load cell is disposed on each leg (4 total).

The hopper assembly also may be equipped with one or more, and preferably multiple, hopper load cells, installed to enable monitoring of load present in the hopper at any given time during operation. The hopper load cell(s) may be disposed at any location on the hopper assembly such that the weight can be measured. For example, one or more hopper load cells may be disposed on one or more legs of the hopper supports affixed to the conveyor belt assembly.

Similarly, the level of proppant may be monitored and reported through the alternative or additional use of level sensors installed within the silos and/or hopper and equipped to report the detected level of proppant in the associated silo or hopper, or all of them. Such level sensors may be selected from a variety of commercially available level sensors capable of detecting a level of proppant present in a silo or hopper and transmitting, preferably substantially continuously, a signal indicative of the detected level, including for example mechanical, acoustic, radar, laser and inductive level sensors.

By utilizing multiple load cells and/or level sensors, the controller of the system of this invention received redundant data which enables mathematical compensation for inaccurate information from a malfunctioning load cell or level sensor. The various load cells and level sensors should be of the type that can send load information as electrical or wireless signal transmissions to a controller that monitors loads or levels in each of the silos, and in the hopper, to allow for control of the gates associated with each silo and control of the speed of the conveyor belt motor(s), so as to control the volume, weight and speed of the proppant feed entering the hopper and the blender or other downstream target location for the feed of proppant. In a system with multiple silos, the controller may also provide for control of which silo gates, and which conveyor belt housing gates, are open and which are closed, along the length of the conveyor belt assembly, to control the way in which proppant is fed onto the conveyor belt or belts. The silo content may also vary from one silo to the next, and the control system may enable control of multiple feeds of different particular materials onto the same conveyor belt or belts, when it is desirable to feed multiple types of particulate matter.

Method of Operation

The silos of the delivery system are configured such that, when all gates at the silo outlet and any gates present within the conveyor belt assembly are in an open position, the proppant disposed in the silos that are opened will flow via gravity through the outlet into the respective enclosed chute, and then into the housing of the conveyor belt assembly. The controller can be programmed so that proppant will not flow from the silo after filling the part of the conveyor belt under the diverter and its respective inlet gates. As an alternative to such controller programming, when the conveyor stops and the belt fills up to the level of the diverter, as a result no more proppant will flow from the diverter until the belt moves and there is again some space below the diverter created by the belt's movement of material. Flow is only initiated when the belt runs, allowing belt speed to control proppant flow. Proppant on the conveyor belt(s) while operative to move load will pass along the conveyor belt(s) to the hopper. From the hopper, proppant may be controllably dispensed into the blender for mixing with other components to form the frac fluid, for example, or other fluid to be pumped down hole. In one aspect of the invention, the hopper feeds its load into a downspout or tube which is disposed within a blender hopper, so that the end of the downspout is just below a fill level for the blender hopper that is above auger screws within the blender hopper. In this way, load from the assembly hopper flowing into the blender hopper will stop when the level of particulate matter in the blender hopper is above the level of the lower end of the downspout. Proppant in the downspout will then build up and the load in the system's hopper will increase. Hopper load cells detecting an increase in weight of the load in the system's hopper may initiate, at a predefined weight, a control sequence to stop or pause the conveyor belt(s) feed, the silo(s) feed (via the silo gate(s)), or both, if desired.

Certain operations of the delivery system may be implemented by conventional system controller or a computer executing a computer program on a computer readable medium, where the computer program includes machine-readable instructions causing the computer to execute one or more of protocols for monitoring, displaying and/or controlling the delivery operations, or to issue commands to other motors, generators, vacuum systems, gates or other devices to execute one or more operations. Conventional control systems may be configured electronically or via programming for monitoring loads detected in the silos and/or hopper, power to conveyor belt motors or vacuum systems, and any one or more of the gates between the silos and the chutes or gates in the conveyor belt assembly, as well as speed of the conveyor belt or one or both of the conveyor belts (when two are present), enabling users to adjust the proppant feed rate and volume to optimize the same for various circumstances that may require it, such as proppant weigh variations and variations in the amount or rate of feed of proppant needed for a given fluid mixture or operation.

Yet another aspect of the invention is that the known weight of the particular matter that is being fed into the blender, as measured by the hopper load cells on the legs of the hopper of the system, can be used in conjunction with the flow rate of the fluid being passed through the blender, to calculate by way of the controller (or a separate blender controller) the density of the slurry leaving the blender. Typically, this is done by a densitometer that is positioned within the flowline downstream of the blender. However, numerous issues can affect the measured density of the slurry. In one aspect of the invention, provided would be a simple method by which the densitometer can be calibrated, or alternatively slurry density can be measured in the absence of the densitometer (e.g., in the event of densitometer failure), to control the blender.

From all of the foregoing, it should now be appreciated that some of the advantageous features of various aspects of the invention may include one, some or all of the following:

- Multiple fill ports on the silos at different heights that are linked together via the pneumatic feed line, allowing for rapid filling of the silos. As the lower fill ports are covered by sand, the ports above continue to allow sand into the silo. This enables a higher flow rate of the sand into the silo than traditional silos which are filled only from the top.
- Particulate matter (e.g., proppant such as sand) is gravity fed from each silo to the main conveyor belt through enclosed chutes that each link their respective silo to the housing surrounding the conveyor belt system, rather than being fed from each silo to an intermediate belt that then delivers proppant to the main conveyor belt. The flow of sand from each gravity silo is controlled by the belt speed of the main conveyor belt. Linking belt speed to sand delivery rate allows for improved manual control and simplified process control.
- The design of the mechanism by which the sand is fed from the silo to the conveyor belt ensures that: (a) the amount of sand at any point on the conveyor is effectively the same; (b) silica dust that would normally be generated by sand free-falling onto the conveyor is contained within the silo feed and conveyor belt system. In one aspect of the invention, sand is moved from the silo to the hopper of the system (or even more preferably to the blender hopper, where the blender hopper is substantially enclosed) at less than atmospheric pressure to prevent the escape of silica dust.
- Proppant is delivered by the belt to a hopper that is situated over the blender. One or more load cells are utilized on the legs of the hopper to ensure that precise amounts of proppant are delivered to the blender. Sight glass indicators on the hopper can provide manual backup.
- Load cells are utilized on one or more legs of the proppant silos to precisely monitor the amount of proppant remaining in each silo and discharging from the silo.
- Each silo can deliver to either belt with a pants leg-style diverter. Sand or proppant flow is regulated by gates in each leg of each diverter, rather than moving the feed chutes.
- The proppant delivery system is fully redundant (multiple silos, chutes, conveyor belts and belt drives) as is the dust suppression system. The whole system is set up with redundancy, although it can be operated using only one generator, one vacuum system and one belt; the dual belts will be used together in normal operation, but only one is required to operate for the system to work.

Silos are free standing and self-supporting with outriggers for wind stability. They can be linked together for increased stability in extreme wind conditions.

Silos are transported by an erector tractor-trailer that positions the silos within reach of conveyor through the adjustable, enclosed chutes.

At no time is the sand or other proppant exposed to rain or other precipitation, which can affect the proppant delivery.

Silica dust or other proppant-derived dust captured in the dust suppression system/vacuum unit is disposed of by a solids trap system that has an attached auger that feeds the waste into sacks for disposal, and the vacuum system can be extended to further encompass the blender for additional dust control.

The silo/dust system data (e.g., belt(s) speed, load cell data from hopper and silos) is fed into a job control van or other system controller. This allows an engineer to remotely monitor proppant rates and determine how new proppant delivered to the location is distributed among the silos.

Silos are equipped with relief valve assemblies to protect from overpressure while filling.

In addition to being a critical aspect of the dust control system, the fact that the conveyor belt(s) are completely covered by the housing adds to the safety of the system. The housing covers have built in kill switches so that the system cannot operate with any of the covers open.

There are backup batteries that allow the silo and belt gates to be active without the generator system in place.

Non-limiting examples of aspects of the invention may include at least the following:

A1. A delivery system for feeding particulate matter to a target location at a well site, the system comprising
- a transportable conveyor belt assembly comprising a housing forming one or more housing inlets and enclosing one or more motorized conveyor belts configured to feed the particulate matter placed thereon to the target location;
- one or more transportable silos, each silo forming one or more silo inlets all of which are in fluid communication with a particulate matter supply line, each of the silo inlets extending through a side wall of the respective silo, each of the silo inlets of the respective silo being disposed at a different location from the others along a longitudinal axis of the respective silo; and
- one or more enclosed chutes, each of the chutes being detachably attachable to a respect one of the silos and forming a passageway extending and sloping downwardly from an outlet of its respective silo to a respective one of the housing inlets, and being configured to receive into the passageway particulate matter gravity fed out of the outlet of the respective one of the silos, through the passageway and into the respective one of the housing inlets of the housing of the conveyor belt assembly;
wherein the silos, the chutes and the housing are configured to substantially enclose the particulate matter as it passes from the silos through the chutes and conveyor belt assembly to the target location, so as to inhibit the release of dust generated from movement of the particulate matter from the silos to the target location.

A2. The system of Claim A1, further comprising a plurality of the transportable silos, and a plurality of the enclosed chutes, respectively, and wherein the housing forms a plurality of housing inlets into which the chutes feed respectively.

A3. The system of Claim A1, further comprising a conveyor belt speed controller and a hopper assembly, wherein the hopper assembly comprises one or more hopper load and/or level sensors configured so that, during system operation, the hopper load and/or level sensors each transmit a signal indicative of either a weight or level of particulate matter within the hopper assembly, to the conveyor belt speed controller, the hopper assembly being configured to feed its contents to a blender.

A4. The system of Claim A1, wherein each of the silos defines a plurality of silo inlets all of which are in fluid communication with a particulate matter supply line feeding into the respective silo, each of the silo inlets extending through a side wall of the respective silo, each of the silo inlets of the respective silo being disposed at a different location from the others along a longitudinal axis of the respective silo.

A5. The system of Claim A3, wherein each of the silos defines a plurality of silo inlets all of which are in fluid communication with a particulate matter supply line feeding into the respective silo, each of the silo inlets extending through a side wall of the respective silo, each of the silo inlets of the respective silo being disposed at a different location from the others along a longitudinal axis of the respective silo.

A6. The system of Claim A3, wherein each of the silos comprises a support base assembly and one or more silo load and/or level sensors configured so that, during system operation, the silo load and/or level sensors each transmit a signal indicative of either a weight or a level of particulate matter within the respective silo, to the conveyor belt speed controller.

A7. The system of Claim A6, wherein the support base assembly of each of the silos comprises two or more couplings configured for attachment to a transport trailer, the couplings being disposed on different, respective sides of the silo.

A8. The system of Claim A3, wherein the enclosed chutes are disposed at an elevation higher than the housing of the conveyor belt assembly, so that the conveyor belt assembly may be uncoupled and transported away from the rest of the system without relocating the silos.

A9. The system of Claim A3, further comprising a vacuum generator in fluid communication with the housing, the enclosed chutes and the hopper.

A10. The system of Claim A3, further comprising a plurality of the transportable silos, and a plurality of the enclosed chutes, respectively, and wherein the housing forms a plurality of housing inlets into which the chutes feed respectively and wherein the housing encloses at least two motor-driven conveyor belts, each being configured to feed the particulate matter entering the housing by way of the housing inlets to the target location during operation.

B1. A method for controlling the rate of feed of a particulate matter into a blender for mixing components of a desired fracturing fluid, comprising
- providing a delivery system according to any one of the foregoing system embodiments, at a well site;
- feeding particulate matter into the silos; and
- feeding the particulate matter from the silos to the conveyor belts through the chutes and operating the conveyor belts to convey a feed of particulate matter from the silos into the blender.

B2. The method according to Claim B1, wherein the feed of particulate matter from the silos to the blender are substantially enclosed and under vacuum during operation of the delivery system.

B3. The method according to either of Claims B1 or B2, wherein, when the delivery system is according to Embodiment A6 or A7, the method further comprises adjusting the speed of the conveyor belts through the conveyor belt speed controller, based at least in part upon the signals from the hopper load and/or level sensors, the silo load and/or level sensors or all of them, indicative of the weight of particulate matter within the hopper assembly, within the silos or within both.

C1. A method for controlling the rate of feed of a particulate matter into a blender for mixing components of a desired fracturing fluid, comprising feeding particulate matter into a plurality of transportable silos; and feeding by gravity the particulate matter from one or more of the silos to one or more enclosed chutes and into a conveyor belt assembly comprising a housing enclosing one or more conveyor belts; and operating the conveyor belts to convey a feed of particulate matter from the silos into a hopper assembly in fluid communication with the blender;

wherein the silos, the chutes and the housing are configured to substantially enclose the particulate matter as it passes from the silos through the chutes and conveyor belt assembly to the hopper assembly, so as to inhibit the release of dust generated from movement of the particulate matter from the silos to the hopper assembly.

C2. The method according to Claim C1, wherein the feed of particulate matter from the silos to the blender is substantially enclosed and under vacuum while the particulate matter is fed from the silos to the blender.

C3. The method according to Claim C2, further comprising adjusting the speed of the conveyor belts through a conveyor belt speed controller, based at least in part upon signals from one or more hopper load and/or level sensors, from one or more silo load and/or level sensors or from both the hopper load and/or level sensors and the silo load and/or level sensors, indicative of either a weight or a level of particulate matter within the respective hopper or silos, as applicable.

While the foregoing is directed to various aspects of the invention, other and further aspects of the invention may be devised without departing from the basic scope thereof as determined by the claims that follow.

That which is claimed is:

1. A delivery system for feeding particulate matter to a target location at a well site, the system comprising a transportable conveyor belt assembly comprising a housing forming one or more housing inlets and enclosing one or more motorized conveyor belts configured to feed the particulate matter placed thereon to the target location;

one or more transportable silos, each silo forming one or more silo inlets all of which are in fluid communication with a particulate matter supply line, each of the one or more silo inlets extending through a side wall of the respective silo, each of the one or more silo inlets of the respective silo being disposed at a different location from any other of the one or more silo inlets along a longitudinal axis of the respective silo; and one or more enclosed chutes, each of the one or more chutes being detachably attachable to a respective one of the one or more silos and forming a passageway extending and sloping downwardly from an outlet of its respective silo to a respective one of the housing inlets, and being configured to receive into the passageway particulate matter gravity fed out of the outlet of the respective one of the silos, through the passageway and into the respective one of the housing inlets of the housing of the conveyor belt assembly;

wherein the one or more silos, the one or more chutes and the housing are configured to substantially enclose the particulate matter as it passes from the silos through the chutes and conveyor belt assembly to the target location, so as to inhibit releasing of dust generated from movement of the particulate matter from the silos to the target location.

2. The system of claim 1, further comprising a plurality of the transportable silos, and a plurality of the enclosed chutes, respectively, and wherein the housing forms a plurality of housing inlets into which the chutes feed respectively.

3. The system of claim 1, further comprising a conveyor belt speed controller and a hopper assembly, wherein the hopper assembly comprises one or more hopper load and/or level sensors configured so that, during system operation, the hopper load and/or level sensors each transmit a signal indicative of either a weight or a level of particulate matter within the hopper assembly, to the conveyor belt speed controller, the hopper assembly being configured to feed its contents to a blender.

4. The system of claim 3, wherein each of the silos defines a plurality of silo inlets all of which are in fluid communication with a particulate matter supply line feeding into the respective silo, each of the silo inlets extending through a side wall of the respective silo, each of the silo inlets of the respective silo being disposed at a different location from any other silo inlet along a longitudinal axis of the respective silo.

5. The system of claim 3, wherein each of the silos comprises a support base assembly and one or more silo load and/or level sensors configured so that, during system operation, the silo load and/or level sensors each transmit a signal indicative of either a weight or a level of particulate matter within the respective silo, to the conveyor belt speed controller.

6. The system of claim 5, wherein the support base assembly of each of the silos comprises two or more couplings configured for attachment to a transport trailer, the couplings being disposed on different, respective sides of the silo.

7. The system of claim 3, wherein the enclosed chutes are disposed at an elevation higher than the housing of the conveyor belt assembly, so that the conveyor belt assembly may be uncoupled and transported away from the rest of the system without relocating the silos.

8. The system of claim 3, further comprising a vacuum generator in fluid communication with the housing, the enclosed chutes and the hopper.

9. The system of claim 3, further comprising a plurality of the transportable silos, and a plurality of the enclosed chutes, respectively, and wherein the housing forms a plurality of housing inlets into which the chutes feed respectively and wherein the housing encloses at least two motor-driven conveyor belts, each being configured to feed the particulate matter entering the housing by way of the housing inlets to the target location during operation.

10. The system of claim 1, wherein each of the silos defines a plurality of silo inlets all of which are in fluid communication with a particulate matter supply line feeding into the respective silo, each of the silo inlets extending through a side wall of the respective silo, each of the silo inlets of the respective silo being disposed at a different location from any other silo inlet along a longitudinal axis of the respective silo.

11. A method for controlling the rate of feed of a particulate matter into a blender for mixing components of a desired fracturing fluid, comprising
providing a delivery system according to Claim 5 at a well site;
feeding particulate matter into the silos; and
feeding the particulate matter from the silos to the conveyor belts through the chutes and operating the conveyor belts to convey a feed of particulate matter from the silos into the blender.

12. The method according to claim 11, wherein the feed of particulate matter from the silos to the blender are substantially enclosed and under vacuum during operation of the delivery system.

13. The method according to Claim 12, wherein the method further comprises adjusting the speed of the conveyor belts through the conveyor belt speed controller, based at least in part upon the signals from the hopper load and/or level sensors, the silo load and/or level sensors or all of them, indicative of either a weight or a level of particulate matter within the hopper assembly, within the silos or within both.

14. A method for controlling the rate of feed of a particulate matter into a blender for mixing components of a desired fracturing fluid, comprising
providing a delivery system according to Claim 9 at a well site;
feeding particulate matter into the silos; and
feeding the particulate matter from the silos to the conveyor belts through the chutes and operating the conveyor belts to convey a feed of particulate matter from the silos into the blender.

15. The method according to claim 14, wherein the feed of particulate matter from the silos to the blender are substantially enclosed and under vacuum during operation of the delivery system.

* * * * *